United States Patent
Lanzani et al.

[11] Patent Number: 5,720,999
[45] Date of Patent: Feb. 24, 1998

[54] TRAY OF PLASTICS MATERIAL FOR FOOD SUBSTANCES WHICH TEND TO RELEASE LIQUIDS

[75] Inventors: Federico Lanzani, Verolanuova; Renato Mauri, Manerbio, both of Italy

[73] Assignee: SIRAP-GEMA S.p.A., Brescia, Italy

[21] Appl. No.: 604,876

[22] Filed: Feb. 22, 1996

[51] Int. Cl.$^6$ .............................. B65D 1/34; B65D 85/00
[52] U.S. Cl. .................................................. 426/129
[58] Field of Search ............................ 426/106, 129; 206/524.6, 557

[56] References Cited

U.S. PATENT DOCUMENTS

| | | | |
|---|---|---|---|
| 4,702,377 | 10/1987 | Grone | 206/557 |
| 4,949,897 | 8/1990 | Pawlak et al. | 426/129 X |
| 5,135,787 | 8/1992 | Bair | 426/129 X |

FOREIGN PATENT DOCUMENTS

| | | | |
|---|---|---|---|
| 46956 | 3/1982 | European Pat. Off. | 426/129 |
| 182 139 | 5/1986 | European Pat. Off. | |
| 544-562 | 6/1993 | European Pat. Off. | |
| 574-819 | 12/1993 | European Pat. Off. | |
| 2688474 | 9/1993 | France | |
| 90 13 898 U | 1/1991 | Germany | |
| 1168925 | 10/1969 | United Kingdom | 426/129 |
| WO 94/00366 | 1/1994 | WIPO | 426/129 |

*Primary Examiner*—Leo B. Tentoni
*Attorney, Agent, or Firm*—Ostrolenk, Faber, Gerb & Soffen, LLP

[57] ABSTRACT

A tray of plastics material for foodstuffs which may release liquids including a base and side walls constituted by an upper layer and a lower layer, the layers forming the side walls being joined together while those forming the base are spaced apart to define an interspace, in which the upper layer is pierced by holes having a diameter of 0.2–1.5 mm and is of foamed plastics material including a surfactant and the surface of the upper layer facing the interspace is rough.

10 Claims, 2 Drawing Sheets

TRAY OF PLASTICS MATERIAL FOR FOOD SUBSTANCES WHICH TEND TO RELEASE LIQUIDS

BACKGROUND OF THE INVENTION

The present invention relates generally to a tray for the packaging of food products.

More particularly, the invention relates to a tray of plastics material for packaging foodstuffs such as meat and fish which may release serum or other liquids and which is able to avoid these foods being in prolonged contact with the released liquids and which can prevent these liquids from being visible within the package.

A problem is encountered in the packaging of foodstuffs such as meat and fish which tend to release serum, which is that of providing packages which are able to isolate and hide the blood released from the foodstuff since it is found that its presence and visibility within the package reduce the attractiveness of the package to the purchaser.

Of the prior-art solutions to this problem, the simplest is that of providing a tray with a wad or layer of absorbent material, generally paper. This solution is described, for example, in European Patent Applications EP-A-0182139, FR-A-2688474, GB-A-1168925, EP-A-0544562 and in the utility model DE9013898.8.

The absorbent layer may simply be fixed to the inner surface of a tray of plastics material or interposed between two sheets of plastics material, of which that in contact with the food has holes through which the liquid released from the food is conveyed to the interposed absorbent layer.

The tray mentioned above has the disadvantage of being made of materials of different types, that is, foamed plastics, generally polystyrene, and paper or like hydrophilic materials, that are difficult to separate from each other with the result that there is little or no possibility of recycling them. Moreover the cost of the production of such trays, because of the presence of the paper, is considerably higher than that of conventional, non-absorbent trays.

Finally, the wad or sheet of absorbent material impregnated with serum released from the foodstuff is not a pleasing sight to the purchaser, neither at the moment of purchase nor, even less, on opening of the package.

Trays are also known which are made from only a single material, generally foamed polystyrene, which are able to isolate the liquid released by the food by allowing it to fall under gravity into an interspace between two sheets of the plastics material, the liquid passing through holes formed in the sheet on which the food is placed. Examples of such trays are provided in Patent Applications EP-A-0574819 and WO 94/00366.

Trays of this type described above have the problem of having holes which are necessarily rather large in order to allow the serum to drain under gravity and hence they easily allow the serum collected in the interspace to be seen. Moreover the blood may easily return to the sheet in contact with the food if the tray is overturned or simply inclined.

SUMMARY OF THE INVENTION

The problem at the root of the present invention is that of providing a tray for foodstuffs which tend to release liquids which avoids the problems indicated above with reference to prior-art trays.

Such a problem is resolved according to the invention by a tray of plastics material for foodstuffs which may release liquids, comprising a base and side walls constituted by an upper layer and a lower layer, the layers forming the side walls of which are joined together while those forming the base are spaced from each other to define an interspace, wherein the upper layer is pierced by holes having a diameter of 0.2–1.5 mm and is of foamed plastics material including a surfactant and in that the surface of the upper layer facing the interspace is rough.

Preferably the lower layer is also of foamed plastics material containing a surfactant and its surface facing the interspace is rough.

The foamed plastics material used for the production of the tray according to the invention is preferably selected from the group comprising polystyrene polypropylene, polyethylene, polyethylene terephthalate, polyvinyl chloride and their copolymers.

Foamed polystyrene is particularly preferred.

The surfactant in the foamed plastics material used in the production of the tray according to the invention preferably constitutes from 0.2–10% by weight of the total weight of the material and it may be selected from surfactants in common use, whether anionic, cationic or non ionic.

To advantage the surfactant is contained in the foamed plastics material in quantities which may vary from 1–3% by weight of the total weight and is preferably a salt of a sulphonic acid having the formula R—SO$_3$H or a sulphuric ester having the formula R—OSO$_3$H, where R is selected from the group comprising alkyl and alkaryl groups, with an alkali or alkaline earth metal.

A surfactant which has been found to be particularly useful for the purposes of the present invention is the aliphatic sulphonate sold by the firm NOVACROME under the name HOSTASTAT SYSTEM E 3904®.

The thickness of the interspace defined by the upper and lower layers is preferably between 0.1 and 5 mm and, to advantage, between 0.2 and 3 mm.

In order to further increase the absorption capacity of the tray according to the invention even further, a superabsorbent gel, such as, for example, the product FAVORPAC 300® made by the firm STOCKHAUSEN, or other salts of cross-linked polyacrylic acid, may be inserted in the interspace.

The number of holes in the upper layer of the tray is generally between 10 and 100 per dm$^2$ and they are preferably arranged in the peripheral regions of the base of the tray.

Obviously slits having widths of about 0.2–1.5 mm may be provided instead of holes.

The thickness of the two layers constituting the tray is conveniently between 1 and 3 mm.

BRIEF DESCRIPTION OF THE DRAWINGS

The advantages of the tray according to the invention will become clearer from the detailed description of one embodiment thereof, given below by way of non-limitative example, with reference to the appended drawings, in which.

DETAILED DESCRIPTION OF THE INVENTION

Figure 1:
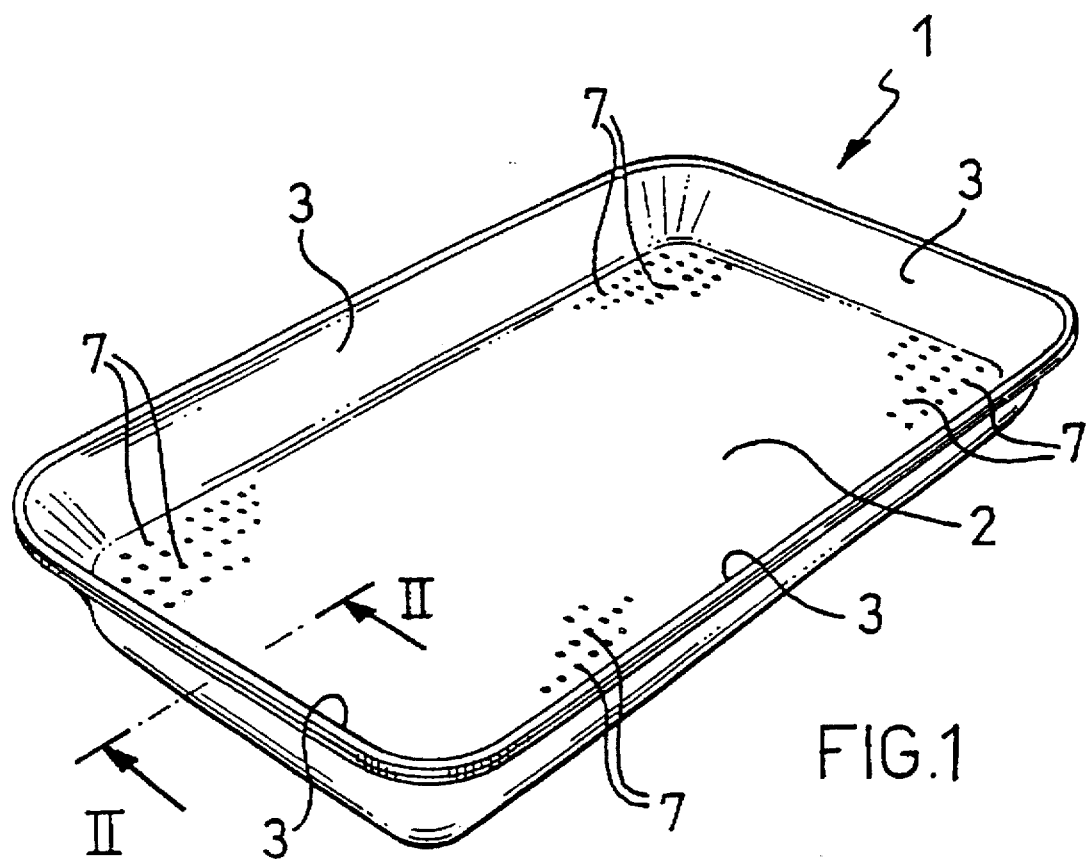
FIG. 1 is a perspective view of a tray according to the invention.

With reference to FIG. 1, a tray according to the invention comprises a body 1 having a base 2 and side walls 3.

Figure 2:
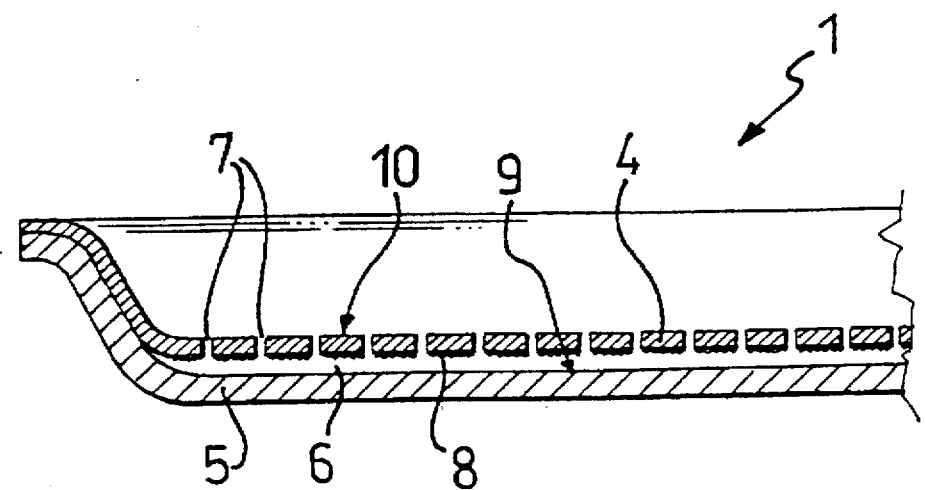
FIG. 2 is a partial cross-section of a tray according to the invention.

With reference to FIG. 2, a tray according to the invention is constituted by an upper layer 4 and a lower layer 5, both of plastics materials, the layers constituting the side walls 3 being joined together while those forming the base 2 are spaced apart to define an interspace 6. The layers 4 and 5 are joined firmly together, for example by heat-sealing or glueing.

Figure 3:
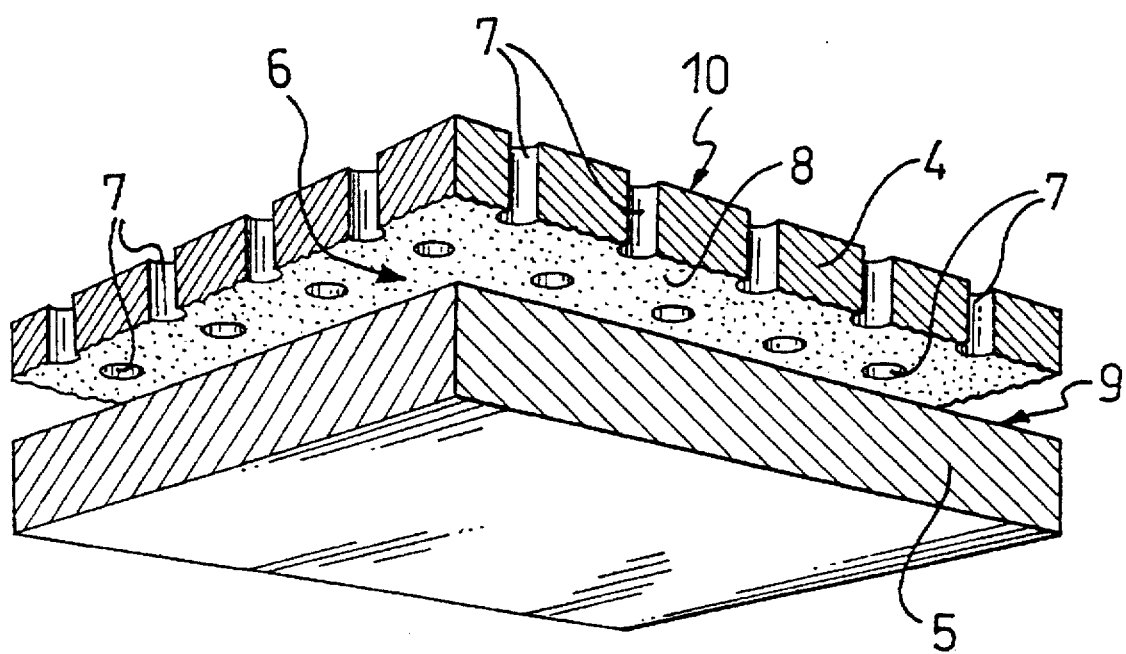
FIG. 3 is a perspective view of a detail of the tray of FIG. 1.

The upper layer 4 is pierced by holes 7 having a diameter of 0.2–1.5 mm. As may be seen from FIG. 3, the surface 8 of the layer 4 facing the interspace 6 is rough as a result either of mechanical abrasion or treatment with suitable chemical reagents.

In one embodiment, not illustrated in the drawings, the surface 9 of the layer 5 facing the interspace 6 is also roughened like the surface 8 of the layer 4.

When the tray according to the invention of the type described is used for packaging foodstuffs, such as meat, which tend to release aqueous liquids, the liquid freed from the foodstuff encounters the holes 7 in the surface 10 of the upper layer 4 of the tray and passes through these holes, notwithstanding their small diameter, by virtue of the surfactant present in the foamed plastics material constituting the layer 4 which considerably reduces the natural water-repellence of the plastics material, increasing the adhesive forces between the solid (plastics material) and the liquid until these exceed the cohesive forces between the molecules of the liquid and enabling the liquid to wet the surface 10 of the layer 4 and to penetrate the holes 7.

To facilitate the ingress of the liquid into the holes 7, depressions may be formed in the surface 10 of the layer 4 centred on the holes 7.

After the liquid has passed through the entire thickness of the layer 4 through the holes 7, it reaches the surface 8 of this layer which, following the abrasion, is rough and formed with a close network of capillary channels which result from the rupture of the cells in the surface of the foamed plastics material.

As soon as it reaches the surface 8, the liquid diffuses rapidly by capillary action into the network of channels and this has the further effect of exerting a sucking action on the liquid which is on that surface of the layer 4 in contact with the food.

The rough surface 8 of the layer 4 is able to retain a considerable volume of liquid in the capillary network, preventing its return to the opposite surface 10 in contact with the food even when the tray is inclined or indeed overturned.

Whenever the tray according to the invention is used to package foodstuffs which tend to release very large volumes of liquid, it is convenient for the lower layer 5 also to be made of foamed plastics material containing a surfactant, the surface 9 facing the interspace 6 being roughened.

Thus any excess liquid which is not retained by the surface 8 of the upper layer 4 may traverse the interspace 6 to reach the rough surface 9 of the lower layer 5 and will then diffuse through the latter's capillary network to be retained therein.

Whenever there is no particular need to retain larger volumes of liquid than usual, the lower layer 5 of the tray according to the invention may conveniently be made from any plastics material, even a non-foamed plastics material and even a recycled plastics, with consequent reductions in the production costs.

The lower layer 5 may also be made in such a manner that it has several protuberances which contact the upper layer 4 in order to increase the resistance of the tray to compression and deformation during packaging or transport.

The lower layer 5 may also be designed with ribs or grooves to form labyrinths in order to increase the surface available for retaining the liquid.

Obviously the two layers constituting the tray may be made of different colours and of different plastics materials to accord with differing technical or market requirements.

The surfaces of the layers of foamed plastics material may be roughened in various ways. For example, once a layer of plastics material has been extruded through a die-head, one surface thereof may be abraded by passage through a machine generally used for rubbing-down wood.

Alternatively use may be made of chemical reagents which can attack the smooth surface film.

The tray according to the invention may be produced by methods well known in the art.

For example, the upper and lower layers, once extruded and subjected to any treatment described above, may be fed into a thermoforming machine suitable for plastics materials, the two layers being guided simultaneously by chains to a heating station, after which the upper and lower parts of the tray are vacuum-formed.

The mould for the forming is so designed that a strong mechanical pressure is exerted on the side walls of the tray, which have previously been heated at the heating station, so as to join and seal the upper and lower parts together.

Finally the usual operations for opening the moulds and cutting the trays obtained are carried out.

The holes in the upper layer of the tray may, for example, be made by perforation with a machine having a roller with needles before the upper sheet is sent to the thermoforming station.

Alternatively needles may be provided in the cutting device so that the perforations are formed during the cutting of the edge of the tray.

The tray according to the present invention has a series of advantages over the prior-art trays.

First of all, it has the advantage over trays including a wad or layer of paper-like, absorbent material of being made solely from plastics material and therefore of being easy to recycle. Moreover the cost of producing a tray of the invention is considerably less than that for the manufacture of the trays mentioned above.

In comparison with prior-art trays made from a single material, the tray of the present invention has the advantage that it absolutely prevents any liquid released from the foodstuff from being seen by virtue of the extremely small diameter of the holes in the upper layer of the tray.

Moreover the tray of the present invention also differs from the prior-art trays mentioned above by virtue of the fact that the strong retaining action exerted on the liquid by the porous-capillary structure of the rough surface of the upper layer of the tray prevents the liquid released from the foodstuff from returning to the surface on which this foodstuff is arranged.

Moreover the liquid retained by the rough surface is not in fact visible to the purchaser of a product packaged in the tray of the invention since it is separated from the surface exposed to view by the entire thickness of the layer of foamed plastics material and cannot be seen through this layer.

We claim:

1. A tray of plastics material for foodstuffs which releases liquids, comprising a base and side walls constituted by an upper layer and a lower layer, the layers forming the side walls of which are joined together while those forming the base are spaced from each other to define an interspace, wherein the upper layer is pierced by holes having a diameter of 0.2–1.5 mm and is of foamed plastics material including a surfactant and in that the surface of the upper layer facing the interspace is rough.

2. A tray according to claim 1, wherein the lower layer is also of foamed plastics material containing a surfactant and its surface facing the interspace is rough.

3. A tray according to claim 1, wherein the foamed plastics material is selected from the group consisting of polystyrene polypropylene, polyethylene, polyethylene terephthalate, polyvinyl chloride and their copolymers.

4. A tray according to claim 2, wherein the foamed plastics material is selected from the group consisting of polystyrene polypropylene, polyethylene, polyethylene terephthalate, polyvinyl chloride and their copolymers.

5. A tray according to claim 3, wherein the foamed plastics material is polystyrene.

6. A tray according to claim 4, wherein the foamed plastics material is polystyrene.

7. A tray according to claim 1, wherein the surfactant is contained in the foamed plastics material in quantities which varies from 0.2–10% by weight of the total weight of the foamed plastics material.

8. A tray according to claim 7, wherein the surfactant is contained in the foamed plastics material in quantities which varies from 1–3% by weight of the total weight of the foamed plastics material.

9. A tray according to claim 8, wherein the surfactant is an alkali or alkaline earth metal salt of a sulphonic acid having the formula R—$So_3H$ or a sulphuric ester having the formula R—$OSO_3H$, where R is selected from the group consisting of alkaryl groups.

10. A tray according to claim 2, wherein the surfactant is contained in the foamed plastics material in quantities which varies from 1–3% by weight of the total weight of the foamed plastics material and is an alkali or alkaline earth metal salt of a sulphonic acid having the formula R—$SO_3H$ or a sulphuric ester having the formula R—$OSO_3H$, where R is selected from the group consisting of alkyl and alkaryl groups.

* * * * *